United States Patent

Hörner et al.

Patent Number: 5,388,554
Date of Patent: Feb. 14, 1995

[54] INTAKE MEANS FOR A RECIPROCATING INTERNAL COMBUSTION ENGINE

[75] Inventors: Thomas Hörner, Mannheim; Rolf Schmidt, Hemsbach, both of Germany

[73] Assignee: Klockner-Humboldt-Deutz AG, Cologne, Germany

[21] Appl. No.: 167,080

[22] Filed: Dec. 16, 1993

[30] Foreign Application Priority Data

Dec. 24, 1992 [DE] Germany ............................. 4244193

[51] Int. Cl.⁶ .......................................... F02M 35/10
[52] U.S. Cl. ......................... 123/184.43; 123/184.45; 123/184.48; 123/184.52
[58] Field of Search ............... 123/308, 184.21, 184.25, 123/184.35, 184.43, 184.45, 184.48, 184.52

[56] References Cited

U.S. PATENT DOCUMENTS

| | | | |
|---|---|---|---|
| 4,368,698 | 1/1983 | Matsuo et al. | 123/184.49 |
| 4,612,903 | 9/1986 | Urabe et al. | 123/184.45 |
| 4,726,337 | 2/1988 | Yoshida | 123/184.45 |
| 4,794,886 | 1/1989 | Iwamuro et al. | 123/184.44 |
| 5,027,769 | 7/1991 | Yoshida et al. | 123/184.44 |
| 5,186,126 | 2/1993 | Tarekado et al. | 123/52 MC |
| 5,213,068 | 5/1993 | Stenfors et al. | 123/41.82 R |
| 5,267,543 | 12/1993 | Novak et al. | 123/52 M |

FOREIGN PATENT DOCUMENTS 3600408 7/1987 Germany.

*Primary Examiner*—Willis R. Wolfe
*Assistant Examiner*—Erick Solis
*Attorney, Agent, or Firm*—Hardaway Law Firm; Charles L. Schwab

[57] ABSTRACT

This invention relates to an intake means for a reciprocating internal combustion having a plurality of cylinders having cylinder heads in each of which there are provided at least two charging ducts (14, 15), provided with inlet valves, for intake air for the respective cylinder, of which charging ducts at least one is designed as a swirl duct, one of the charging ducts (14, 15) being controllable via a throttle valve (18) at an associated intake passage (4, 3). In order to achieve a simple design along with a favorable configuration of the valves in terms of space, the intake passages (3, 4) and the charging ducts (14, 15) are incorporated in a cast intake manifold (1) with the intake passages (3, 4) and the charging ducts (14, 15), cylinder by cylinder, being separated from another by means of partitions (2, 16), and a control valve (18) for one intake passage (4) being positioned next to an uncontrolled intake passage (3) at the inlet end to the intake manifold (1).

5 Claims, 1 Drawing Sheet

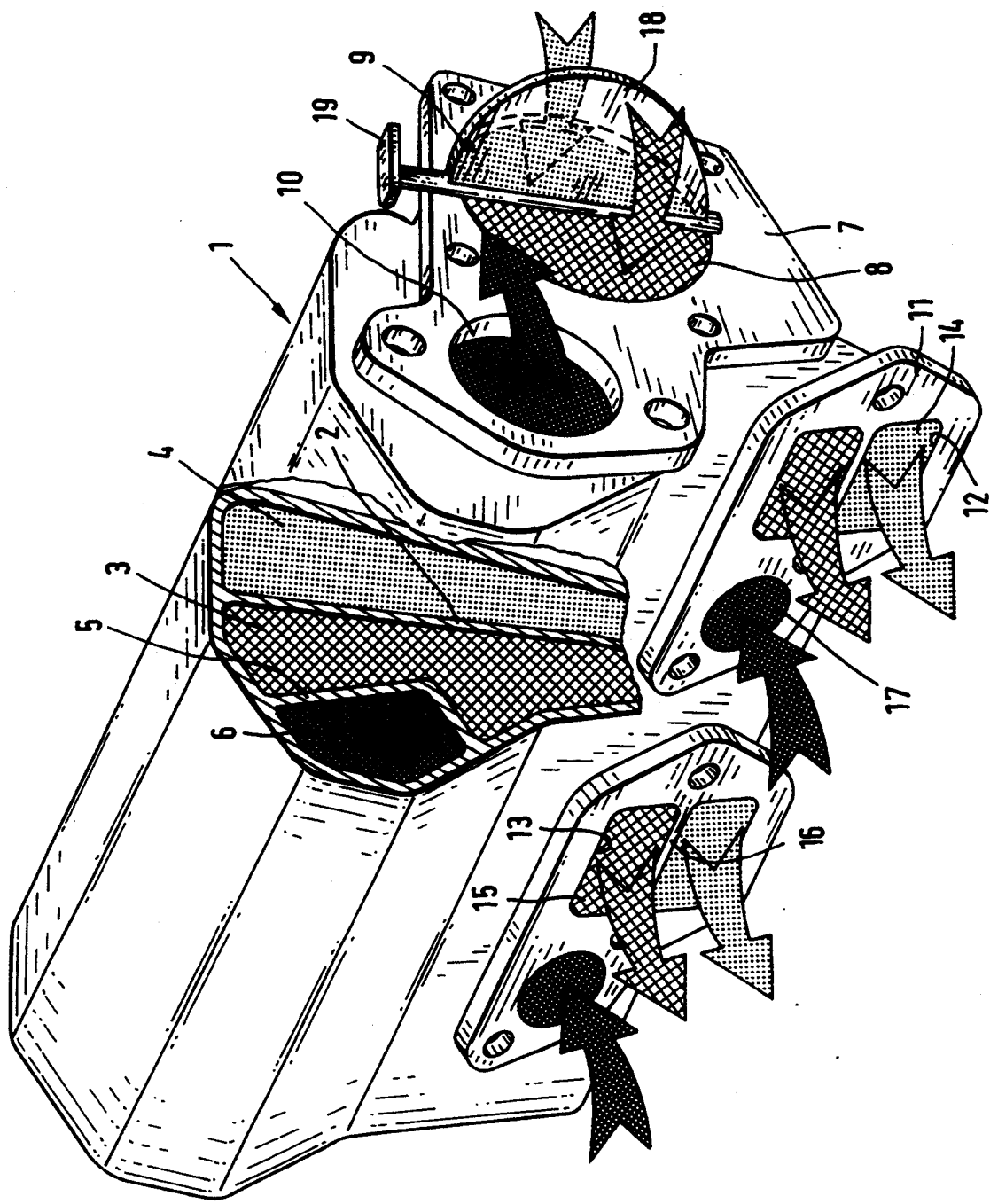

INTAKE MEANS FOR A RECIPROCATING INTERNAL COMBUSTION ENGINE

TECHNICAL FIELD

This invention relates to an air intake means for a reciprocating internal combustion engine having multiple air intake valves per cylinder and multiple air intake passages.

BACKGROUND OF THE INVENTION

German patent DE-PS 36 00 408 shows a reciprocating internal combustion engine having three intake valves per cylinder, wherein each of the three intake passages to the valves has a throttle valve in order to achieve an optimal filling and charge motion in each cylinder for each operating range. The three individual intake systems are designed or adapted to one another in accordance with the requirements for various engine speed ranges. The combustion air is conveyed by an intake manifold and separate intake passages issuing therefrom, to the individual charging ducts provided with throttle valves. The valves are built into the charging ducts inside the cylinder head in order to influence the partial-load behavior. These features, however, require sufficient space relationships, which are not always available in engine designs. Additionally, a multiplicity of individual parts are required, thus making the design expensive and more susceptible to malfunctions.

The inclusion of the valves in the respective intake lines shortly ahead of the cylinder also leads to corresponding problems, in addition to which there are manufacturing problems as well as a reduction in the passage cross section even when the valve is fully opened.

OBJECTS AND BRIEF SUMMARY OF THE INVENTION

It is an object of the invention to create an intake means for a reciprocating internal combustion engine having multiple intake valves which is simple in design and has a valve configuration which conserves space.

In the present invention, the intake lines are brought together in an intake manifold, separated from one another by an appropriate partition, that is, the intake manifold is divided into two separate intake ducts or passages for combustion air, the control of the combustion air supply to the cylinders being effected by means of an appropriate control valve at the beginning or air inlet end of the intake manifold for better partial-load behavior. This design is suitable for a reciprocating internal combustion engine, in particular a Diesel engine, having four-valve cylinder heads, that is, having two intake valves and two exhaust valves for each cylinder.

BRIEF DESCRIPTION OF THE DRAWINGS

One embodiment of the invention is illustrated in the appended drawing of an air intake means shown in a perspective and partially cut-away view.

DETAILED DESCRIPTION OF THE DRAWINGS

The intake means illustrated includes an intake manifold 1 fabricated as a one-piece casting, which intake manifold is subdivided in the axial direction by means of a partition or wall 2 into two intake passages 3, 4, each of which forms an intake passage. A cooling water return passage 6 is also provided, which is separated from the intake passages 3, 4 by means of a partition or wall 5.

The intake manifold 1 is provided at its inlet end with a connecting flange 7, which has two adjacent, half-moon-shaped inlet openings 8, 9, separated from one another by means of the partition 2. The inlet openings 8, 9 lead to the intake passages 3, 4, and an outlet opening 10 leads to the cooling water return passage 6.

The intake manifold 1, at one of its lateral sides, is further provided with a pair longitudinally spaced connecting flanges 11, each of which has air inlet openings 12, 13, arranged one above another, for combustion air to be conducted to one of the two associated engine cylinders via charging ducts 14, 15 connected with the intake passages 4 and 3, respectively, each of said charging ducts 14, 15 likewise being separated, in turn, by a partition or wall 16. By this means, the intake passage 3 having two charging ducts 15 connected thereto is completely separated from the intake passage 4 and the two charging ducts 14 to which the intake passage 4 is connected.

A cooling water return opening 17 is provided for cooling water overflow returned from the associated cylinder head to the cooling water return passage 6 which is in juxtaposed heat transfer relationship with air intake passage 3.

The intake passage 3 is uncontrolled, that is, not provided with a control valve at the inlet end, while the charging ducts 15 connected thereto are designed as swirl ducts.

The intake passage 4 is provided, at its inlet opening 9 at the air inlet end of the intake manifold 1, with a half-moon-shaped control valve 18, which is controlled via an appropriate control valve mechanical system (schematically indicated as 19) in accordance with the load range in which the reciprocating internal combustion engine is operated. The charging ducts 15 connected to the intake passage 4 can, if appropriate, also be designed as swirl ducts having the sense of the swirl formed opposite to the charging ducts 15.

By controlling the combustion air supply to the intake passage 4, the interplay of the two intake passages 3, 4 relative to the moderate and low load range is promoted. A mutual influencing of the swirl paths superimposed on one another is reduced as a function of load, to maximally zero in the moderate and low load ranges, because the intake passage 4 controlled by the control valve 18 is partially or entirely shut off. In the upper load range, in contrast, the swirl in the cylinders is brought to a stop by means of full turning on of the intake passage 4, in order to achieve in each case an optimal filling and charge motion in each cylinder for each operating range.

By providing the herein described air intake manifold, the manufacturing expense is markedly diminished and the number of parts used is reduced.

What is claimed is:

1. An intake means for a reciprocating internal combustion engine having a plurality of cylinders, a cylinder head for each cylinder and a plurality of air intake valves in each cylinder head, said intake means comprising:

an air intake manifold (1) having first and second air inlet openings (8, 9)

a pair of air charging ducts (14, 15) in said air intake manifold (1) for intake air for each cylinder, of which charging ducts at least one is designed as a swirl duct, a first intake passage (3) connecting said first inlet opening (8) to said one charging duct, a second intake passage (4) connecting said second inlet opening (9) to the other of said charging ducts (14, 15), a throttle valve (18) positioned at said second inlet opening (9) operable to control air flow in said second intake passage (4), partitions (2, 16) separating said intake passages (4, 3) and said charging ducts (14, 15) cylinder by cylinder, said intake manifold (1) being free of air flow restrictions in said first intake passage (3).

2. The intake means of claim 1, wherein said intake manifold (1) includes a water passage (6) for cooling water returned from the cylinders, said water passage (6) being in juxtaposed heat transfer relation to at least one of said air intake passages (3, 4).

3. The intake means of claim 2 wherein said intake manifold (1) is a one-piece casting provided with a pair of connecting flanges (7, 11).

4. The intake means of claim 1 wherein said control valve (18) is in a half-moon shape.

5. The intake means of claim 1 wherein said intake manifold (1) is a one-piece casting provided with a pair of connecting flanges (7, 11).

* * * * *